Oct. 10, 1933.  E. G. F. LOCKYER  1,930,394
ELECTRIC APPARATUS FOR KEEPING FOOD HOT OR HEATING SAME
Filed April 14, 1931   2 Sheets-Sheet 1
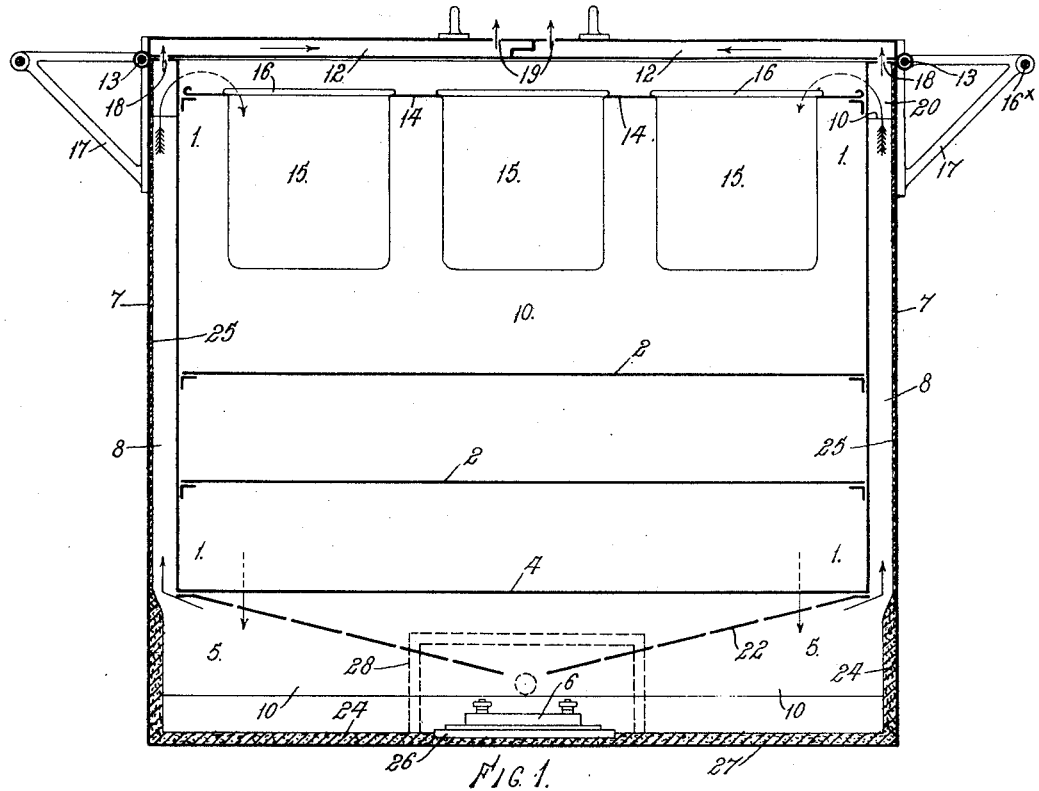
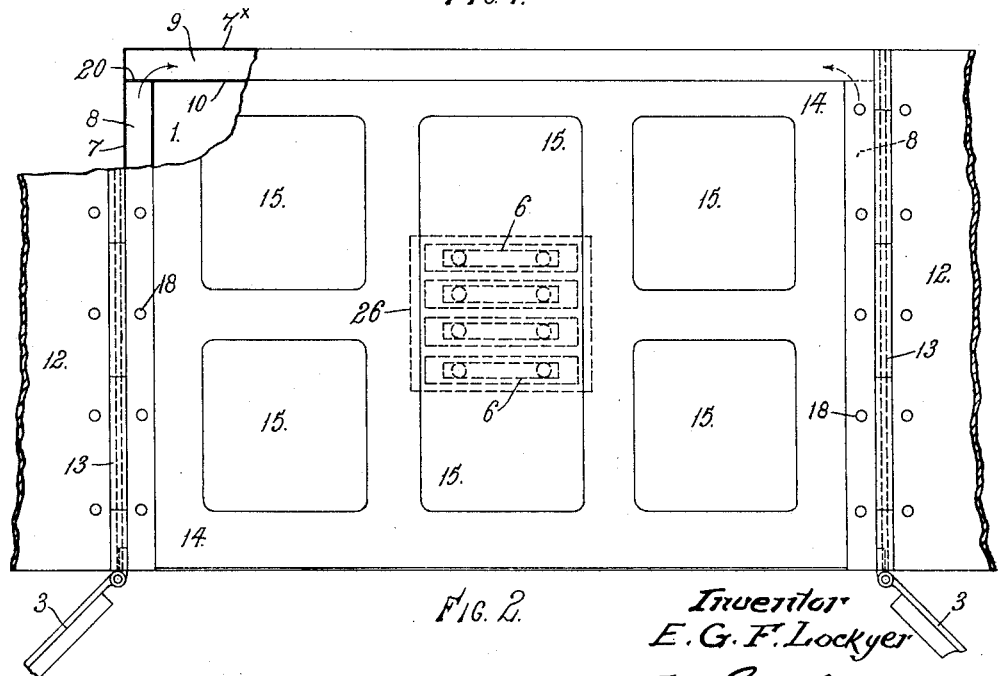
Inventor
E. G. F. Lockyer

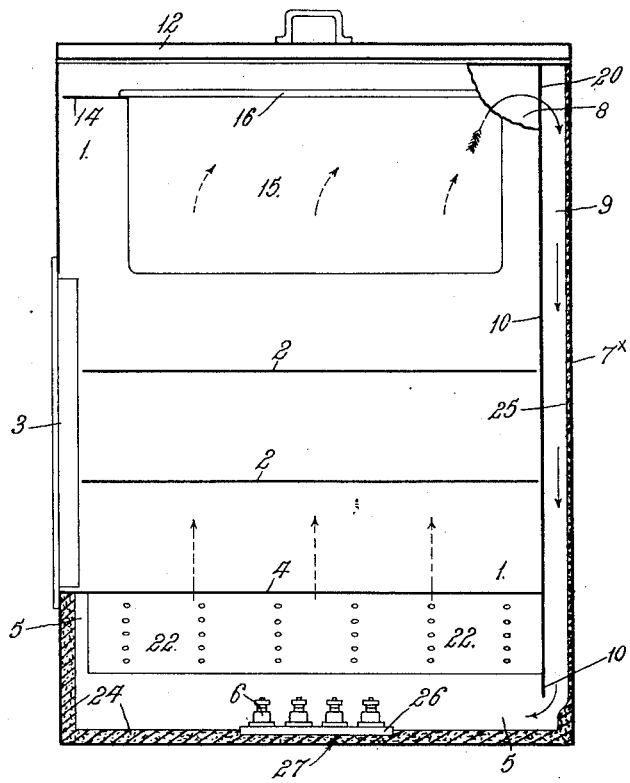
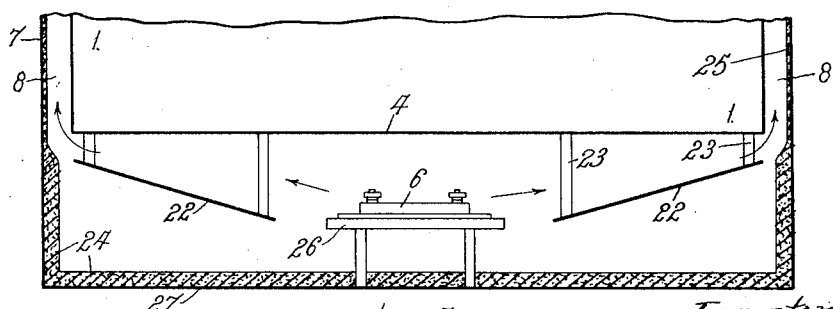

Patented Oct. 10, 1933

1,930,394

UNITED STATES PATENT OFFICE 1,930,394

ELECTRIC APPARATUS FOR KEEPING FOOD HOT OR HEATING SAME

Emily Godwin Fry Lockyer, London, England

Application April 14, 1931, Serial No. 530,036, and in Great Britain October 22, 1930

2 Claims. (Cl. 219—35)

This invention has reference to apparatus for keeping food hot, or heating it, and keeping it hot, of the kind in which the heat is produced and supplied by electricity, which heats air and the heated air passes or circulates through flues or space on the outsides of the chamber or chambers or cabinets in which the food is held and is to be kept hot.

The primary objects and effects of the invention are to provide improvements in connection with apparatus of the kind concerned, by which the apparatus, or the hot chamber or cabinet may be brought up to the temperature desired to keep the food at the right degree of heat, more quickly, and by which the better general heating is brought about and maintained.

In the apparatus hereinafter described and the manner of operating, the improvements under this invention are comprised.

For convenience, the invention will be described in connection with the species of the larger kind of apparatus of the type concerned, wherein the food is adapted to be held on trays or carriers within the hot chamber, some of which may be readily withdrawable, and this chamber has hot air flues or spaces outside it at the sides and back, and if desired, at the top or roof, and cover doors thereon; while the electric heating elements are disposed in an air heating chamber or space below the bottom of the hot chamber. At the front doors are provided for introduction and withdrawal of food.

In the heating chamber or space between the electric heating elements, and the bottom of the hot chamber plates are provided, and are inclined or curved so that the hot air rising from the elements strikes them, and is caused to flow at an increased rate from the points where it is heated, towards and into and through the flues or hot air spaces. Further these inclined or curved plates (preferably thin metal plates) are perforated so that some of the heat from the heating elements can pass up through them and reach and act upon the bottom of the hot chamber, and so heat it; and this air after acting on the bottom will pass up one or more of the flues or hot air spaces.

In some cases the heated air after passing up through the flue or air spaces may be discharged in the atmosphere, while in others it may be circulated through the flues or spaces, up through some and down through others, and then reheated, and again through the flues.

The inclined or curved perforated plates or media may be two in number, and if desired fluted and inclined or curved up from a central position in the heating chamber; or two or more sets of such plates may be used and arranged in the heating chamber above the electric elements; and these may be disposed and arranged below the said plates or media in any suitable manner, and in any desired number.

As a modification regarding the perforated plates or media, where a plurality of same are used, some of them may be inclined or curved as stated, and one or some horizontal.

The invention is illustrated in the annexed drawings, in which Figure 1 is a sectional elevation of the heating apparatus, Figure 2 is a plan partly in section, Figure 3 is a cross section, and Figure 4 is a partial sectional elevation of a modification.

The arrangement of the particular apparatus shown is one in which movable trays are provided within the heating chamber, and at the upper part pans or containers for loose food are supported, above the upper portions of which are horizontal doors, by opening which access can be had to the upper pans or containers.

Referring generally to the drawings, 1 represents the inner chamber in which the food to be kept warm is introduced and contained, and which in the case shown is provided with slidable trays 2 on which food or food containers can be placed, and in front of which are vertical hinged doors 3, for enabling access to be had to the interior of the chamber for introducing and removing the food or food containers or holders.

The apparatus shown when required to be moved from place to place, may be carried on a wheeled trolley and so rendered locomotive.

Below the bottom 4 of the heating chamber 1 is a chamber or space 5, on the bottom of which are the electric heating elements 6, by which the air in this chamber is heated.

7 are the walls of the outer casing of the apparatus within which the chamber 1 is disposed, and 8 are spaces at each side of the apparatus between the walls of the inner chamber 1 and the outer casing walls 7; while 9 is a space between the back plate 10 of the chamber 1, and the back plate 7× of the outer casing. These spaces 8 and 9 are open below, and lead into the air heating space 5, and they constitute jackets or conduits for the hot air.

The upper part of the apparatus is normally closed by hollow doors 12, hinged at 13 to the upper edges of the sides of the apparatus; and these doors when closed—as shown in Figure 1

1—constitute an upper closure covering the top of the chamber 1; and directly under these doors is a plate 14—which may be removable—having apertures in it through which are passed containers 15 for food, which are supported from the plate 14 by flanged rims 16 as shown. These containers may have lids on them so that they are individually covered as well as the whole of the upper part of the chamber being covered and closed by the doors 12.

When the upper doors 12 are opened, that is moved 180° about their hinges 13, they will rest on the cross bar, 16× which is supported on brackets 17, which constitute a means or handles for propelling the apparatus.

The spaces or conduits 8 are closed at the top as is also the space or conduit 9; and at the upper part of the side conduits 8 are holes 18, above which are holes in the under or inner plate of the hollow doors 12, these holes as illustrated coinciding. Thus hot air has access to the doors. Also a few holes 19 are provided in the upper plate of the adjacent ends of the doors for the purpose of providing for movement or expansion and contraction of air.

In the case shown in the drawings, the back conduit 9 is adapted to serve as a return flue for the hot air, that is the air passing up from the chamber 5 passes through the side conduits or spaces 8, and thence through openings 20 in the plate 10 into the top of the back conduit or flue 9, which extends down from this point to below the bottom plate 4, and to near the bottom of the chamber 5, so that its return into the chamber 5 is ensured against being interfered with by the hotter air which passes into the bottom of the flues 8.

Between the heaters 6 and the bottom plate 4 of the chamber 1 are the inclined metal plates 22, which are provided with perforations, and these it is found have the effect of causing the heating up of the apparatus when starting it, to be effected in a relatively short time; and this short period of heating up is in many cases very important. In the apparatus shown in Figures 1 to 3, these perforated plates are inclined upwards from the centre to the bottom angles of the chamber 1, to which they may be secured; whilst in the modification shown in Figure 4 the plates 22 are inclined as shown, and are carried by supporting bars 23, in which case the electric heating unit 6 is about level with the lower edges of the plates.

In the case of the plates 22 being perforated, as in the case shown, the perforations enable some of the air to pass through the perforations and act directly on the bottom of the hot chamber 1, and so heat it, whence it passes into the hot air spaces or jackets.

The plates 22 may be flat and inclined as shown in the drawings, or they may be curved in an upward direction; and in some cases may be fluted or corrugated, and inclined, and may be disposed and arranged below the heating chamber 1 proper in any suitable manner, and in any desired number; and in the case of a plurality of plates being used, some of them may be inclined or curved as stated, and one or some horizontal.

The bottom chamber 5 is lagged internally with a substantial thickness of asbestos or other suitable poor conductor of heat 24 at the sides, front, back and bottom to prevent the loss of heat; and the inside of the wall 7 and 7× are also lined with asbestos or like legging 25 to prevent loss of heat.

With regard to the elements 6, these are of any known suitable kind, and are attached to and rest on thick copper or other metal plate 26, which is secured down to the bottom plate 27 of the outer casing of the apparatus; and in the case shown, there are a plurality of these elements 6 arranged side by side as seen in Figure 2; but they may be distributed in the bottom of the apparatus in any suitable way; and current will be carried to and from them through conductors passed through the walls of the outer casing from outside in any suitable way.

In the case illustrated, the apparatus is constructed and adapted so that a complete circulation of air up and down will take place through the apparatus; namely, in this case hot air heated by the elements in the chamber 5 pass up through the lower open ends into the side conduits 8, and then up same to the top, where it passes through the openings 20 in the plate 10 into the back flue 9, down which it flows to near the bottom of the lower chamber 5, and thence down under the lower lip of the plate 10, and back into the chamber 5, wherein it is again heated, and recirculated.

Some of this air passing up the side spaces or conduits 8 can pass into the hollow doors 12.

According to a modification, the air has not complete circulation as above described, and upon that in the air heating chamber 5 being heated, it can pass up and fill the side flues 8, and a back flue 9, which are common in this case and all closed at the upper end, except for the openings 18 leading to the interior of the hollow doors 12; and in this case the openings 20 in the back plate 10 above described are not provided, and the two sets of conduits or spaces 8 and 9 may be common to one another, while the plate 10 will end at a level of the bottom plate 4 and constitutes merely the back plate of the heating chamber 1.

The air heating chamber 5 in front is entirely closed by a plate as seen in Figure 3, as is also the space above the doors 3; and a removable door 28 shown in dotted lines in Figure 1, may be provided in the front plate of the chamber 5, so that free access to the electric unit 6 may be had.

What is claimed is:—

1. Apparatus for keeping food hot or heating food, comprising a food holding chamber open at the top, an outer casing enclosing the sides and back of the food holding chamber and spaced therefrom, the spaces between said chamber and casing forming separate flues at the sides and back, said flue spaces being directly in connection with each other by apertures at the top but out of connection with the interior of the cooking chamber, hollow hinged horizontal doors over the open top of the food-holding chamber and communicating by apertures with the tops of the side flues, a closed air heating chamber below the bottom of the food holding chamber communicating directly with the side and back flues below, and electric heating elements therein.

2. Apparatus for keeping food hot or heating food, comprising a food holding chamber open at the top, an outer casing enclosing the sides and back of the food-holding chamber and spaced therefrom, the spaces between said chamber and casing forming separate flues at the sides and back, said flue spaces being directly in connection with each other by apertures at the top but out of connection with the interior of the cooking chamber, hollow hinged horizontal doors over the open top of the food holding chamber and communicating by apertures with the tops of the side flues, a closed air-heating chamber below the bottom of the food-holding chamber communicating directly with the side and back flues below, and electric heating elements therein, a perforated removable plate supported just below and parallel to the top of said oven, and food-containing pans suspended by their upper edges by the surrounding metal of the perforations.

EMILY GODWIN FRY LOCKYER.